United States Patent [19]

Matsueda

[11] Patent Number: 4,803,475
[45] Date of Patent: Feb. 7, 1989

[54] IMAGE DISPLAY APPARATUS
[75] Inventor: Akira Matsueda, Hachioji, Japan
[73] Assignee: Olympus Optical Company, Ltd., Tokyo, Japan
[21] Appl. No.: 933,881
[22] Filed: Nov. 24, 1986
[30] Foreign Application Priority Data
Dec. 10, 1985 [JP] Japan .................... 60-277210
[51] Int. Cl.$^4$ .............................. G09G 1/00
[52] U.S. Cl. .................... 340/750; 340/814; 340/799
[58] Field of Search ............... 340/750, 798, 799, 703, 340/814

[56] References Cited
U.S. PATENT DOCUMENTS

| 4,326,202 | 4/1982 | Kidode et al. | |
|---|---|---|---|
| 4,439,759 | 3/1984 | Fleming et al. | 340/750 |
| 4,468,662 | 8/1984 | Tanaka | 340/750 |
| 4,511,965 | 4/1985 | Rajaram | 340/750 |
| 4,663,735 | 5/1987 | Navak et al. | 340/750 |
| 4,692,759 | 9/1987 | Pham Van Cang | 340/750 |

FOREIGN PATENT DOCUMENTS

0149746  11/1984  European Pat. Off. .
1033874   6/1966  United Kingdom .
2053537   2/1981  United Kingdom .

Primary Examiner—Marshall M. Curtis
Assistant Examiner—Mahmoud Fatahi-yar
Attorney, Agent, or Firm—Parkhurst, Oliff & Berridge

[57] ABSTRACT

An image display apparatus including a display memory which is accessed by a central processing unit for controlling input/output traffic of image information and by an image display device such as CRT in a time division multiplex mode. There are further provided a circuit for detecting a time deviation between a signal (Ac) representing a period during which the central processing unit can access the display memory and a signal (ALE) denoting an initiation of a machine cycle, and a circuit for controlling the wait condition in the central processing unit in accordance with the detected time deviation, so that the access of the central processing unit to the display memory is always synchronized with the access of the image display device to the display unit.

16 Claims, 7 Drawing Sheets

FIG.8A Ac
FIG.8B 2Ac
FIG.8C CLK
FIG.8D ALE
FIG.8E ACK

FIG.9A Ac
FIG.9B 2Ac
FIG.9C CLK
FIG.9D ALE
FIG.9E ACK

IMAGE DISPLAY APPARATUS

BACKGROUND OF THE INVENTION

Field of the Invention and Related Art Statements

The present invention relates to an image display apparatus comprising a means for controlling the input/output of image information, an image display means and a display memory which is accessed alternately by said input/output controlling means and image display means in a time division multiplex mode.

Such an image display apparatus has been known and is disclosed in Japanese Patent Publication Nos. 58-34,836 and 58-26.

Figure 1:
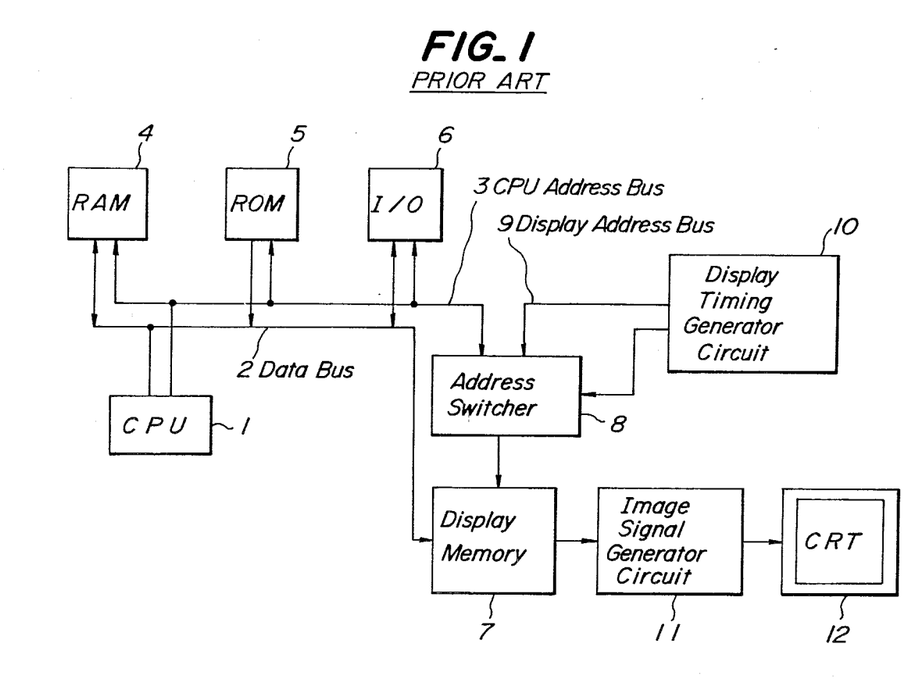
FIG. 1 is a block diagram showing a known image display apparatus.
Figures 2A, 2B, 2C:
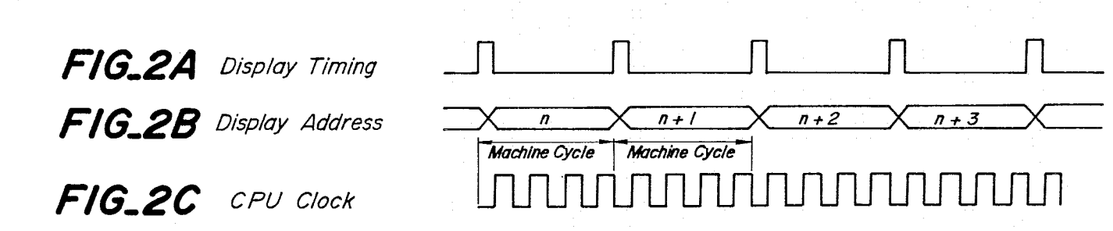
FIGS. 2A to 2F and FIGS. 3A to 3F are time charts for explaining the operation of the known image display apparatus.
Figures 2D, 2E, 2F:
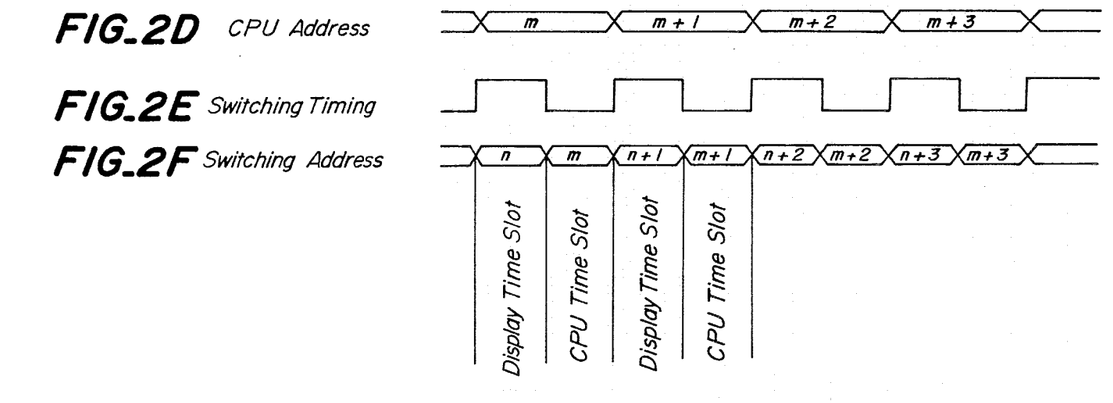

FIG. 1 is a block diagram illustrating a construction of the known image display apparatus. A central processing unit (CPU) 1 for effecting an image information input/output traffic control is connected to data bus line 2 and CPU address bus line 3 through which RAM 4, ROM 5 and I/O unit 6 are connected to CPU 1. There is further provided a display memory 7 which is connected to the data bus line 2 and to an address switcher 8. To the address switcher 8 are connected the CPU address bus line 3 and a display address bus line 9 through which there is further connected a display timing generator circuit 10 for generating all the necessary timings for the display unit, CPU and others. The display memory 7 is connected via an image signal generator circuit 11 to the image display device such as CRT 12.

In case of displaying an image on the CRT 12, at first RAM 4, ROM 5 and I/O device 6 are accessed by means of a signal supplied from CPU 1. The address switcher 8 supplies to the display memory 7 alternately an input/output address supplied by CPU 1 through the CPU address bus line 3 and an display address supplied by the display timing generator circuit 10 through the display address bus line 9, in synchronism with the display timing controlled by the display timing generator circuit 10. Data to be displayed is written in the display memory 7 through the data bus line 2 under the control of an address signal supplied from CPU 1 through the CPU address bus line 2. Then the stored data is read out of the display memory 7 under the control of the address signal supplied through the display address bus line 9 and is supplied to the image signal generator circuit 11 which then produces an image signal. The image signal thus generated is supplied to CRT 12 and is displayed thereon.

FIGS. 2A to 2F are time charts for showing an operation of the known image display apparatus shown in FIG. 1. As can be seen from the drawings, in synchronism with the display timing signals (FIG. 2A) generated by the display timing generator circuit 10, the input address denoted by CPU 1 and the display address denoted by the display timing generator circuit 10 are alternately switched by the address switcher 8 in the time division multiplex mode, and the image data is entered into and then read out of the display memory 7.

In the known image display apparatus mentioned above, since the input address of CPU 1 and display address are switched alternately in synchronism with the display timing, the display timing has to be synchronized with the CPU machine cycle, and thus the access for RAM 4, ROM 5 and I/O unit 6 have to be completed within machine cycles having the same time period.

Figures 3A, 3B:
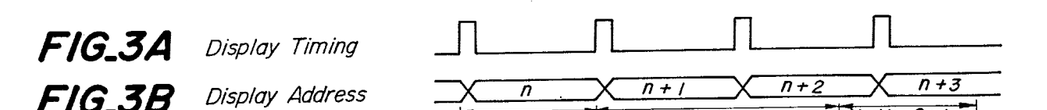
Figure 3C:
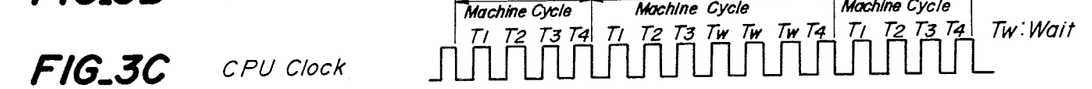
Figures 3D, 3E:
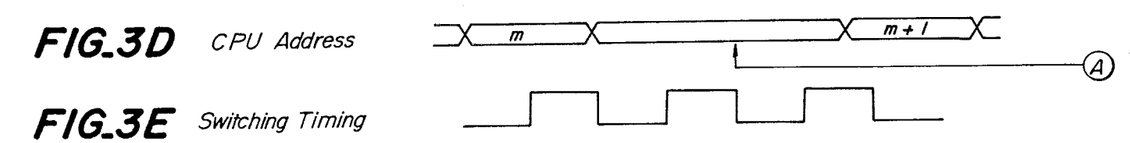
Figure 3F:
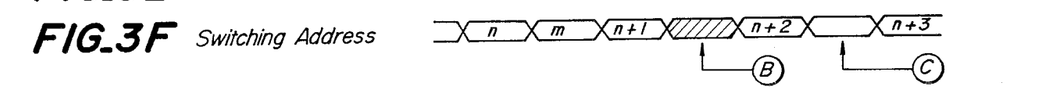

However, it is practically difficult to provide memories and I/O units having the same access time. When ROM and I/O units having longer access times are used, it is required to provide a wait time Tw in CPU 1 as illustrated in FIGS. 3A to 3F. When the wait time Tw is introduced in the machine cycle, the machine cycle is prolonged. In this case, since the access is effected for devices other than the display memory 7, an address period denoted by (B) in FIG. 3F is irrelevant from the image display. Therefore, an output timing of the CPU address is not synchronized with the display timing, and thus the CPU 1 could not access the display unit 7. In FIG. 3F, such an undesired condition is denoted by a reference (C). During a time period denoted by (C), to the display memory 7 is supplied an undesired or erroneous address represented by (A) in FIG. 3D. The undesired phenomenon explained above might occur not only in case of using the memory having a long access time, but also in case of effecting special functions such as multiplication and division in which the length of machine cycle varies in accordance with commands. In this manner, in the known image display apparatus it is practically impossible to provide a wait period in the CPU, so that it is impossible to utilize peripheral LSI having a longer access time. Therefore, a cost of the hardware is liable to be expensive and a serious limitation is imposed upon the function. It should also be noted that even though use may be made of devices having longer access times by providing a wait period in the CPU, the display period might be prolonged and an aspect ratio of a pixel might deviate from 1:1, because a display time of a pixel might be prolonged.

SUMMARY OF THE INVENTION

The present invention has for its object to provide an image display apparatus in which the above mentioned drawbacks of the known apparatus can be obviated, and even when the CPU address timing is not coincident with the display address timing, the synchronization can be attained correctly.

According to the invention, an image display apparatus comprises:

a means for controlling the input/output of image information;

a means for displaying an image;

a display memory which is accessed by said input/output controlling means and image displaying means in a time division multiplex mode; and a means for detecting a time deviation between a signal for denoting a time period during which said display memory can be accessed by said input/output controlling means and a start time instance of a machine cycle in which said display memory is accessed by said input/output controlling means to derive a time deviation signal, and for controlling a wait condition in said input/output controlling means in accordance with said time deviation signal.

In a preferred embodiment of the image display apparatus according to the invention, said time deviation between the signal representing a period during which the display memory can be accessed by the input/output controlling means, e.g. CPU and a start point of the machine cycle, is detected in the unit of a period of clock pulses used in the CPU and the wait condition of the CPU is controlled by the detected time deviation. Therefore, even if the machine cycle of the CPU varies, it is possible to bring the CPU access into synchronism with the display access immediately and therefore, it is possible to use devices having longer access times.

DESCRIPTION OF THE PREFERRED EMBODIMENTS

Figure 4:
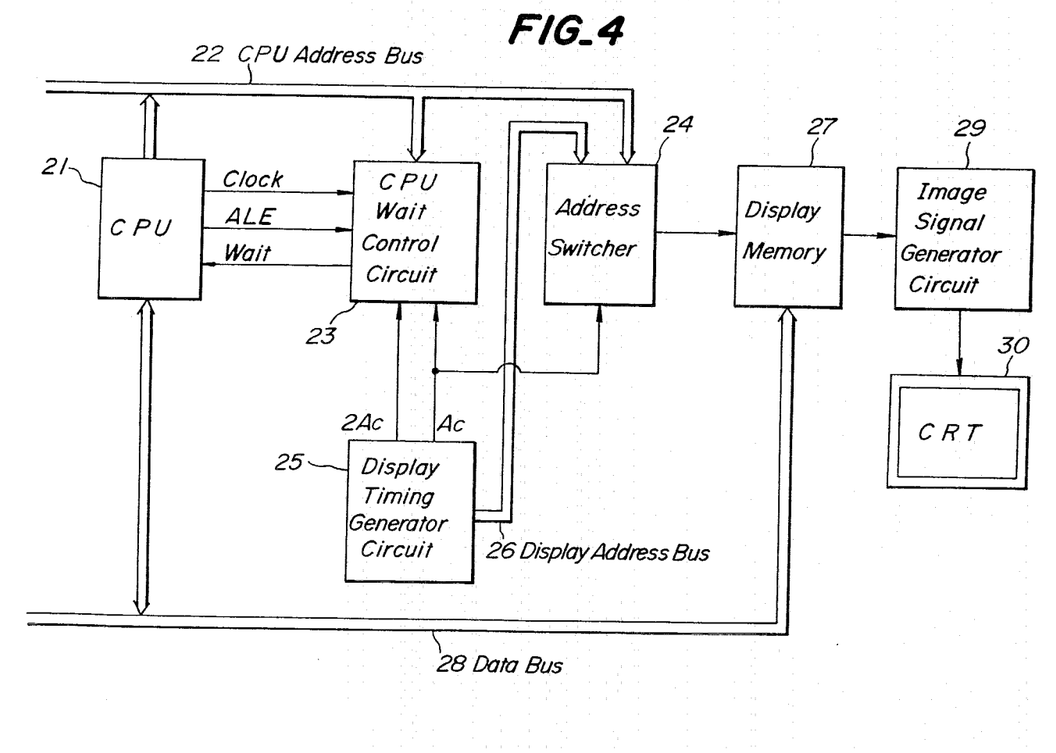
FIG. 4 is a block diagram illustrating an embodiment of the image display apparatus according to the invention.

FIG. 4 is a block diagram showing a construction of an embodiment of the image display apparatus according to the invention. The image display apparatus comprises a central processing unit (CPU) 21 which is connected to an address bus line 22 to which are also connected a CPU wait control circuit 23 and an address switcher 24. The CPU wait control circuit 23 is also connected to the CPU 21 and receives a clock signal and a signal ALE denoting an initiation of a machine cycle of the CPU 21. The CPU 21 receives a wait control signal from the CPU wait control circuit 23. To the CPU wait control circuit 23 is connected a display timing generator circuit 25 which controls an access time period of the CPU wait control circuit 23. The display timing generator circuit 25 further supplies an address switching signal Ac for controlling the address switching and a signal 2Ac having a frequency equal to a double of that of the signal Ac to the CPU wait control circuit 23. To the display timing generator circuit 25 is also connected the address switcher 24, and the signal Ac is supplied from the display timing generator circuit 25 to the CPU wait control circuit 23. At the same time, the display address is supplied to the address switcher 24 via a display address bus line 26. The address switcher 24 switches, under the control of the address switching signal Ac, the CPU address supplied via the CPU address bus line 22 and the display address supplied by means of the display address bus line 26. Then the address switcher 24 supplies alternately the CPU address and the display address to a display memory 27. The display memory 27 stores image data supplied over the data bus line 22 in accordance with the CPU address. Then the stored data is read out of the display memory 27 in accordance with the display address, and the read out data is supplied to an image signal generator circuit 29 to produce an image signal. The image signal thus generated is supplied to a display device such as CRT 30 and is displayed thereon.

In the CPU wait control circuit 23, under the control of the clock signal and machine cycle initiating signal ALE supplied from CPU 21 and the address switching signals Ac and 2Ac supplied from the display timing generator circuit 25, a time relation between the address switching signal Ac and the initiation timing of machine cycle of CPU 21 is detected only when the display memory 27 is accessed by CPU 21. Then the CPU wait control circuit 23 generates a wait control signal for controlling the wait condition in CPU 21.

Figures 5A, 5B:
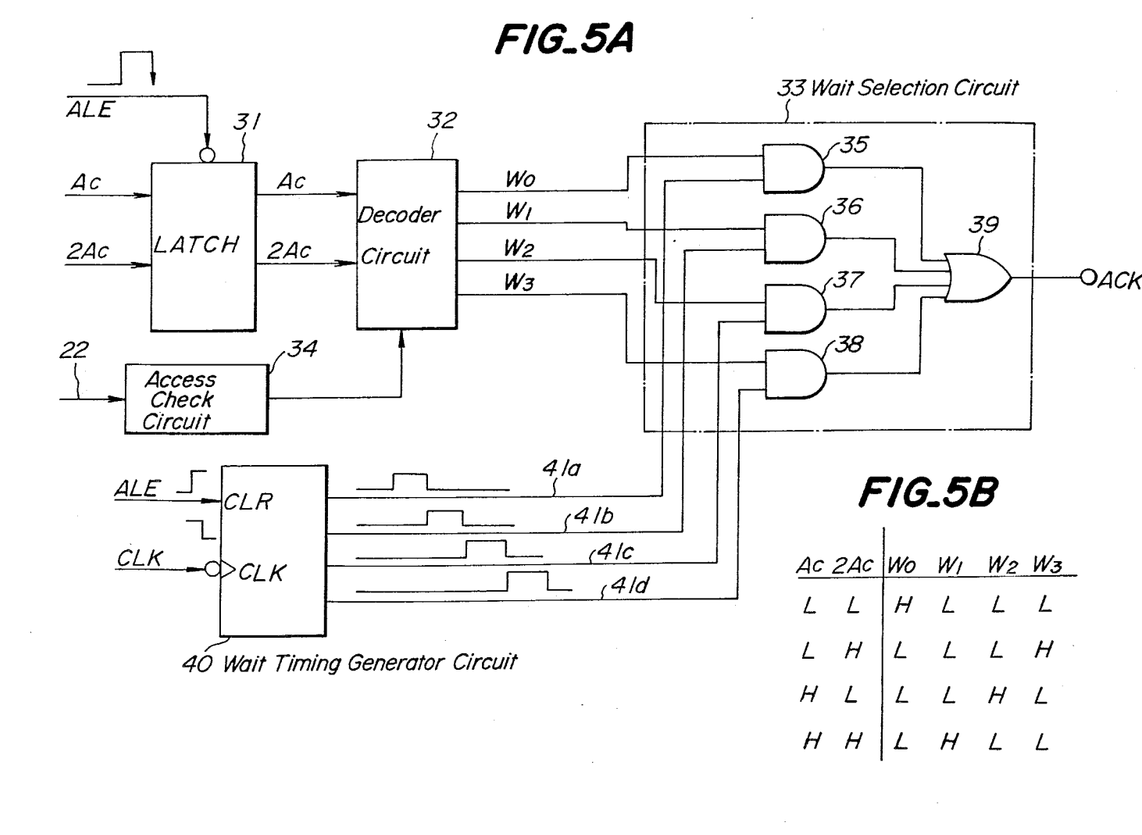
FIG. 5A is a circuit diagram showing a detailed construction of a CPU wait control circuit shown in FIG. 4
FIG. 5B is a diagram showing the operation of a decoder circuit of the CPU wait control circuit.
Figure 6A:
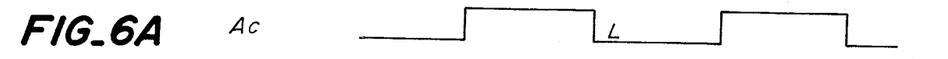
FIGS. 6A to 6E, 7A to 7E, 8A to 8E and 9A to 9E are timing charts for explaining the operation of the CPU wait control circuit shown in FIG. 5.
Figures 6B, 6C, 6D, 6E:
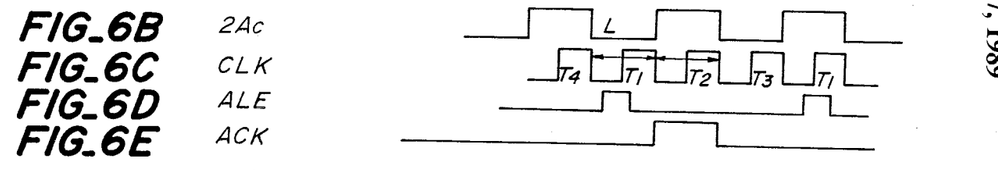

FIG. 5A is a circuit diagram illustrating a detailed construction of the CPU wait control circuit 23. In the present embodiment, a normal machine cycle is composed of four clock signals $T_1$-$T_4$. The CPU wait control circuit comprises a latch circuit 31 having non-inverted input terminals to which the address switching signals Ac and 2Ac are supplied and an inverted input to which the signal ALE is supplied. In response to a trailing edge of the signal ALE denoting the initiation of the machine cycle, the condition (logic high or low level) of the address switching signals Ac and 2Ac is detected, and the detected condition is stored. The stored condition of the address switching signals Ac and 2Ac is supplied to a decoder circuit 32. The decoder circuit 32 generates four wait request signals $W_0$ to $W_3$ which are then supplied to a wait selection circuit 33.

FIG. 5B is a diagram showing a relation between the detected condition of the address switching signals Ac and 2Ac and the wait request signals $W_0$ to $W_3$.

In order to judge whether or not the data supplied from the latch circuit 31 to the decoder circuit 32 is produced within the access time for the display memory 27, to the decoder circuit 32 is connected an access check circuit 34 to which the address bus line 22 is connected. Then the access check circuit 34 confirms with the aid of the address information sent over the address bus line 22 that the relevant signal is to access the display memory 27 and supplies an address check signal to the decoder circuit 32. The wait selection circuit 33 comprises four AND gates 35 to 38 connected in parallel with each other and an OR gate 39 connected to outputs of the AND gates. The wait request signals $W_0$ to $W_3$ generated from the decoder circuit 32 are supplied to one input of the AND gates 35 to 38, respectively. There is further provided a wait timing generator circuit 40 composed of a shift register. The circuit 40 has a non-inverted clear input for receiving the signal ALE and an inverted clock input for receiving the clock pulses CLK from CPU 21. The circuit 40 is reset by a raising edge of the signal ALE and counts the clock pulses within the machine cycle and generates wait timing signals on four output lines 41a to 41d which are then connected to the other inputs of the AND gates 35 to 38, respectively. On the line 41a, there is generated the wait timing signal which becomes a high logic level in response to the trailing edge of the first clock pulse and returns into a low logic level in response to the trailing edge of the second clock pulse. The second line 41b generates the wait timing signal which becomes high in response to the trailing edge of the second clock pulse and returns to the low level in response to the trailing edge of the third clock pulse. Similarly the output line 41c produces the wait timing signal which raises at the trailing edge of the third clock pulse and returns into the low level in response to the trailing edge of the fourth clock pulse, and the fourth output line 41d generates the wait timing signal which assumes the high level from the trailing edge of the fourth clock pulse to the trailing edge of the fifth clock pulse. Therefore, only one AND gate determined by the four wait request signals and the four wait timing signals is enabled at a given timing and an output signal ACK is supplied from the OR gate 39 to CPU 21. In response to the signal ACK, the wait condition in CPU 21 is released. Therefore, this signal ACK can be denoted as a wait release signal. In this manner, according to the present embodiment, a time deviation between the clock signal representing an access allocation period of CPU 21 for the display memory 27 and an initial time of the machine cycle of the access time of CPU 21 for the display memory 27 can be detected in a unit of the period of the clock pulses used in CPU 21 and the wait condition in CPU 21 is controlled in accordance with the detected time deviation and the access of CPU 21 to the display memory 27 can be synchronized with the desired access allocation period.

FIGS. 6A to 6E, 7A to 7E, 8A to 8E and 9A to 9E are timing charts for explaining a manner of attaining the synchronous condition.

FIGS. 6A to 6E denote a normal operation in which the wait condition is not generated in CPU 21. In this case, the high wait request signal $W_0$ is supplied to the AND gate 35 and, in synchronism with the wait timing signal generated on the line 41a, the wait selection circuit 33 generates the wait release signal ACK. Then the machine cycle is completed by four clock pulses.

Figure 7A:
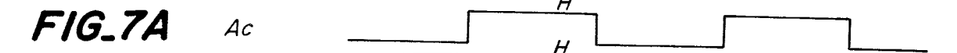
Figures 7B, 7C, 7D, 7E:
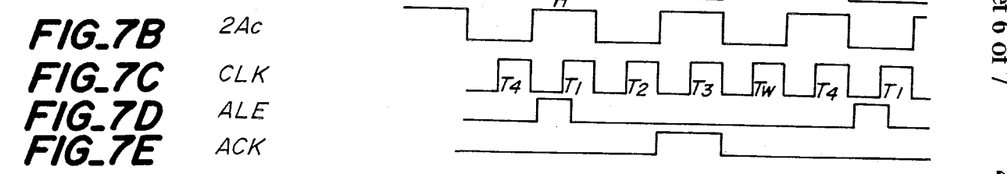
Figures 8A, 8B:
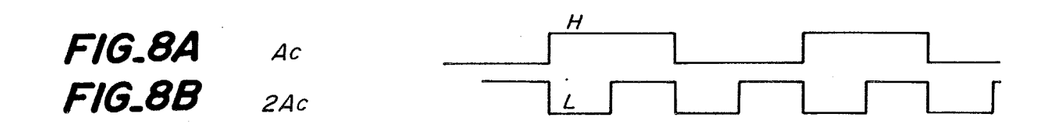
Figure 8C:
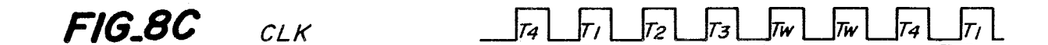
Figures 8D, 8E:
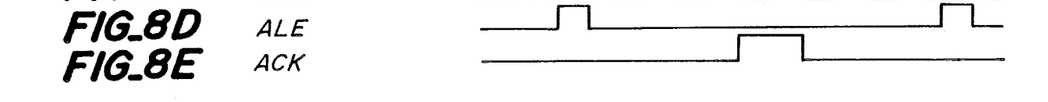
Figure 9A:
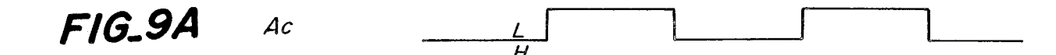
Figures 9B, 9C, 9D, 9E:
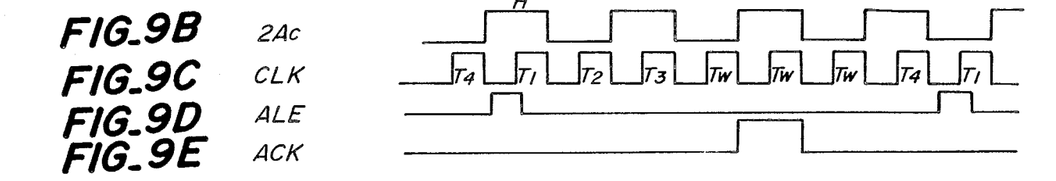

FIGS. 7A to 7E denote a case in which the machine cycle deviates for a period corresponding to three clock pulse periods. In such a case, both the address switching signals Ac and 2Ac are in the higher logic level H, so that the wait request signal $W_1$ is selected and the one input of the AND gate 36 becomes H level. To the other input of the AND gate 36 is supplied the wait timing signal through the line 41b, said wait timing signal starting in response to the trailing edge of the second clock pulse and ending in response to the trailing edge of the third clock pulse. Then the wait release signal ACK shown in FIG. 7E is supplied from the OR gate 39 to CPU 21. In this manner, in CPU 21 the wait condition lasts for one clock pulse period so that the machine cycle is completed correctly.

FIGS. 8A to 8E show a case in which there is produced the time deviation having two clock pulse periods. In this case there is produced a wait condition for two clock pulse periods.

FIGS. 9A to 9E depict a case in which a time deviation for three clock pulse periods occurs. In such a case, in CPU 21 the wait condition lasts for three clock pulse periods.

The present invention is not limited to the embodiment explained above, but various modifications and alternatives may be conceived by those skilled in the art within the scope of the invention. In the above embodiment, the decoder circuit and wait timing generator circuit are succeeded by the wait selection circuit, but it is also possible to produce the wait release signal ACK by directly supplying the output signal of the wait timing generator circuit to the decoder circuit together with the address switching signals Ac and 2Ac.

Further, in the above embodiment, since use is made of the display memory formed by a dual port type RAM, the information data is supplied to the display memory only by switching the address. However, use may be made of an ordinary RAM for the display memory. In such a case, the data bus line must also be switched.

As explained above, according to the present invention, the deviation between the signal denoting a time period during which the central processing unit can access the display memory and a start timing of the machine cycle is detected and the wait condition in the central processing unit is controlled in accordance with the detected deviation time. Therefore, the image storing RAM and ROM and I/O devices can be composed of devices having longer access times, while the display address timing can be always synchronized with the machine cycle of the central processing unit. Therefore, the cost of the image display apparatus can be reduced materially. Further, the restriction in designing the various timings can be mitigated and the freedom of design can be increased. Further, use may be made of commands for multiplication and division having longer machine cycles.

What is claimed is:

1. An image display apparatus comprising:
    an input/output controlling means for controlling input/output of image information;
    a display control means for controlling display of an image;
    a display memory which is accessed by said input/output controlling means and said display control means in a time division multiplex mode; and
    a means connected to said input/output controlling means and said display memory for detecting a time deviation between a start time of a time period during which said display memory can be accessed by said input/output controlling means and a start time of a machine cycle during which said display memory can be accessed by said input/output controlling means to derive a time deviation signal, and for controlling a duration of a wait condition in said input/output controlling means in accordance with said time deviation signal.

2. An image display apparatus according to claim 1, wherein said means for detecting the time deviation detects said time deviation in a unit of a period of clock pulses used in the input/output controlling means.

3. An image display apparatus according to claim 2, wherein said means for detecting the time deviation and controlling the wait condition comprises:
    a latch circuit for detecting a period during which the input/output controlling means can access the display memory at an initiation of a machine cycle;
    an access check circuit for detecting whether the display memory is to be accessed;
    a decoder circuit connected to said access check circuit and said latch circuit for determining a number of clock pulse periods to be waited;
    a wait timing generator circuit for generating a plurality of different wait timing signals; and
    a wait selection circuit connected to said wait timing generator circuit and said decoder circuit for selecting a wait release signal in accordance with said wait timing signals and the number of clock pulse periods to be waited and for supplying the selected wait release signal to the input/output controlling means.

4. An image display apparatus according to claim 3, wherein said latch circuit includes a reset terminal for receiving a signal (ALE) for representing the initiation of the machine cycle, and two input terminals, one for receiving an address switching signal (Ac) and a signal (2Ac) having a frequency equal to twice that of the address switching signal.

5. An image display apparatus according to claim 3, wherein said wait timing generator circuit comprises a shift register having a clear terminal for receiving the signal (ALE) denoting the machine cycle initiation, a clock terminal for receiving the clock pulses, and a plurality of output lines for generating said wait timing signals.

6. An image display apparatus according to claim 5, wherein said wait selection circuit comprises a plurality of AND gates each having one input connected to outputs of the decoder circuit and another input connected to said output lines of the wait timing generator circuit, and an OR gate having inputs connected to outputs of said AND gates.

7. An image display apparatus comprising:
 an input/output controlling means for controlling input/output of image information;
 a display control means for controlling display of an image;
 a display memory which is accessed by said input/output controlling means and said display control means in a time division multiplex mode; and
 a means connected to said input/output controlling means and said display memory for detecting a time deviation between a start time of a time period during which said display memory can be accessed by said input/output controlling means and a start time of a machine cycle during which said display memory can be accessed by said input/output controlling means to derive a time deviation signal;
 a wait timing generator circuit for generating a plurality of different wait timing signals;
 a wait selection circuit connected to said wait timing generator circuit for selecting in accordance with said time deviation signal one of said plurality of wait timing signals generated from said wait timing generator circuit;
 a means for controlling a wait condition in said input/output controlling means in accordance with the wait timing signal selected by said wait selecting circuit.

8. An image display apparatus according to claim 7, wherein said means for detecting the time deviation detects said time deviation in a unit of a period of clock pulses used in the input/output controlling means.

9. An image display apparatus according to claim 8, wherein said means for detecting the time deviation comprises:
 a latch circuit for detecting a period during which the input/output controlling means can access the display memory at an initiation of the machine cycle;
 an access check circuit for detecting whether the display memory is to be accessed;
 a decoder connected to said latch circuit and said access check circuit for determining a number of clock pulse periods to be waited.

10. An image display apparatus according to claim 9, wherein said latch circuit includes a reset terminal for receiving a signal (ALE) for representing the initiation of the machine cycle, and two input terminals, one for receiving an address switching signal (Ac) and a signal (2Ac) having a frequency equal to twice that of the address switching signal.

11. An image display apparatus according to claim 9, wherein said wait timing generator circuit comprises a shift register having a clear terminal for receiving the signal (ALE) denoting the machine cycle initiation, a clock terminal for receiving the clock pulses, and a plurality of output lines for generating said wait timing signals.

12. An image display apparatus according to claim 11, wherein said wait selection circuit comprises a plurality of AND gates each having one input connected to outputs of the decoder circuit and another input connected to said output lines of the wait timing generator circuit, and an OR gate having inputs connected to outputs of said AND gates.

13. An image display apparatus comprising:
 an input/output controlling means for controlling input/output of image information;
 a display control means for controlling display of an image;
 a display memory which is accessed by said input/output controlling means and said display control means in a time division multiplex mode; and
 a means connected to said input/output controlling means and said display memory for detecting a time deviation between a start time of a time period during which said display memory can be accessed by said input/output controlling means and a start time of a machine cycle during which said display memory can be accessed by said input/output controlling means to derive a time deviation signal;
 a wait timing generator circuit for generating a plurality of different wait timing signals;
 a wait selection circuit connected to said wait timing generator circuit for selecting in accordance with said time deviation signal one of said plurality of wait timing signals generated from said wait timing generator circuit;
 a means for controlling a wait condition in said input/output controlling means in accordance with the wait timing signal selected by said wait selecting circuit;
 a latch circuit for detecting a period during which the input/output controlling means can access the display memory at an initiation of the machine cycle;
 an access check circuit for detecting whether the display memory is to be accessed;
 a decoder circuit connected to said latch circuit, said access check circuit and said wait selection circuit for determining the number of clock pulse periods to be waited;
 wherein said means for detecting the time deviation detects said time deviation in a unit of a period of clock pulses used in the input/output controlling means.

14. An image display apparatus according to claim 13, wherein said latch circuit includes a reset terminal for receiving a signal (ALE) for representing the initiation of the machine cycle, and two input terminals, one for receiving an address switching signal (Ac) and a signal (2Ac) having a frequency equal to twice that of the address switching signal.

15. An image display apparatus according to claim 13, wherein said wait timing generator circuit comprises a shift register having a clear terminal for receiving the signal (ALE) denoting the machine cycle initiation, a clock terminal for receiving the clock pulses, and a plurality of output lines for generating said wait timing signals.

16. An image display apparatus according to claim 15, wherein said wait selection circuit comprises a plurality of AND gates each having one input connected to outputs of the decoder circuit and another input connected to said output lines of the wait timing generator circuit, and an OR gate having inputs connected to outputs of said AND gates.

* * * * *